(12) United States Patent
Simony (10) Patent No.: US 8,569,673 B2
(45) Date of Patent: Oct. 29, 2013

(54) IMAGE SENSOR WITH VOLTAGE-LIMITING DEVICE

(75) Inventor: Laurent Simony, Grenoble (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 211 days.

(21) Appl. No.: 13/182,071

(22) Filed: Jul. 13, 2011

(65) Prior Publication Data

US 2012/0012736 A1    Jan. 19, 2012

(30) Foreign Application Priority Data

Jul. 19, 2010    (FR) ...................................... 10-55833

(51) Int. Cl.
*H01L 27/00*    (2006.01)
(52) U.S. Cl.
USPC ................................... 250/208.1; 250/214 A
(58) Field of Classification Search
USPC .............................. 250/208.1, 214 A; 348/308
See application file for complete search history.

(56) References Cited

U.S. PATENT DOCUMENTS

| 7,394,055 B2 * | 7/2008 | Koseki ....................... 250/214 A |
| 2005/0231621 A1 * | 10/2005 | Su et al. ......................... 348/308 |
| 2008/0067326 A1 | 3/2008 | Koseki |
| 2010/0110256 A1 | 5/2010 | Jung et al. |

OTHER PUBLICATIONS

République Française Institut National De La Propriété Industrielle, Rapport De Recherche Préliminaire (Preliminary Search Report); issued in French Patent Application No. 1055833 on Mar. 15, 2011 (2 pages).

* cited by examiner

*Primary Examiner* — Thanh Luu
*Assistant Examiner* — Renee Naphas
(74) *Attorney, Agent, or Firm* — Slater & Matsil, L.L.P.

(57) ABSTRACT

An image sensor includes an active pixel, an amplifier stage, and a voltage-limiting stage. The active pixel is configured to generate an information signal. The amplifier stage is coupled to the active pixel and configured to amplify the information signal. The voltage-limiting stage is coupled to the amplifier stage and includes a current shunting device and a gain device. The current shunting device has a first terminal connected to an output of the amplifier stage, a second terminal connected to a reference voltage node, and a control terminal. The gain device is connected to the control terminal of the current shunting device and configured to decrease the voltage span required to cause the current shunting device to enter into a current shunting mode.

25 Claims, 6 Drawing Sheets

IMAGE SENSOR WITH VOLTAGE-LIMITING DEVICE

CROSS-REFERENCE TO RELATED APPLICATIONS

This application claims the priority benefit of French patent application number 10-55833, filed Jul. 19, 2010, entitled "Image sensor," which is hereby incorporated by reference to the maximum extent allowable by law.

TECHNICAL FIELD

The invention relates to image sensors, in particular the processing of signals delivered by a matrix of pixels of an image sensor, and, more particularly, improving the reading of the information signal arising from a matrix of active pixels manufactured using CMOS technology.

BACKGROUND

An image sensor conventionally comprises a matrix of pixels. Each pixel delivers an electrical signal whose level depends on the quantity of light received.

Traditionally, the processing chain for the signal arising from a pixel comprises several signal amplification stages. These amplification stages are supplied by a current source and are in general all linked to a common ground.

In image sensors, in a general manner, in order to read the information signal arising from the matrix of pixels, a difference is derived between two output voltage levels of a pixel occurring successively over time, the difference between these two voltage levels being proportional to the quantity of light received by the photodiode diode.

The output voltage of the pixel being referenced to the ground of the circuit, it is desirable that the ground potential remains as stable as possible over time: in particular, any fluctuation in the ground potential between the times at which the output voltage levels considered are measured, mars the difference of these levels through an error which may not be possible to correct subsequently, and which might degrade the quality of the image obtained.

Fluctuations in ground potential occur when the current flowing in the ground is not constant: it is therefore necessary to take care that this current remains as constant as possible. A solution for preventing a degradation in the reading of the information signals of an image sensor can consist in limiting the output voltage of the first amplification stage of the sensor so as to keep the current injected into the ground constant.

Figure 1:
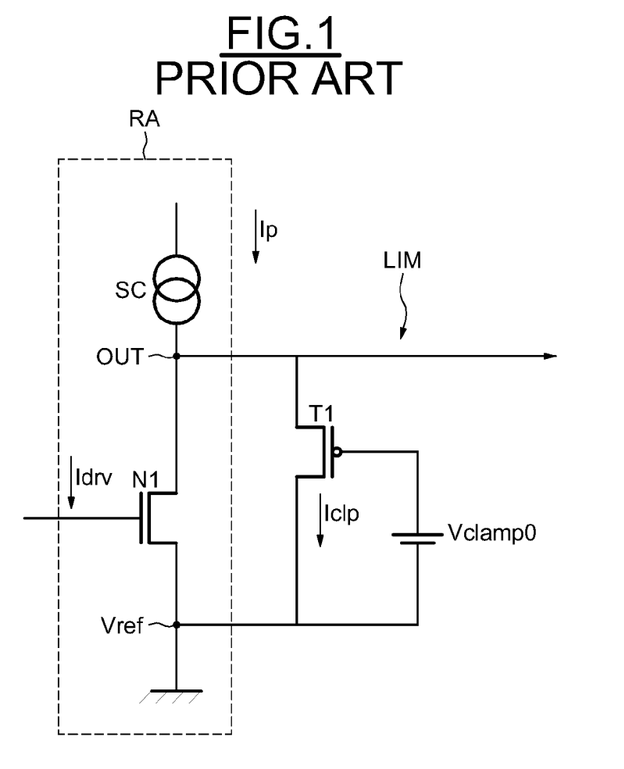
FIG. 1, already described, schematically illustrates an exemplary voltage-limiting device of the prior art.

FIG. 1 schematically illustrates an example for voltage-limiting the output signal of an amplification stage of an image sensor. An example of an amplification stage RA connected to a limiting device LIM has been represented in FIG. 1. The amplification stage RA comprises a transistor N1 of NMOS type connected between an output terminal OUT intended to receive a current source SC and a reference terminal Vref connected to the ground potential.

The limiting device LIM comprises a transistor T1 of PMOS type mounted between the output terminal OUT of the amplification stage RA and the reference terminal Vref. Furthermore, the gate of the transistor T1 is controlled with the aid of a constant voltage Vclamp0. In this configuration, when the voltage of the signal delivered at the output OUT is greater than a certain threshold, which depends on the value of the control voltage Vclamp0 and the characteristics of the transistor T1 of PMOS type, the latter turns on, thus diverting the current towards the reference terminal Vref, here ground. The signal is then said to be voltage-limited. Conversely, when the voltage of the signal is below this threshold, the transistor T1 of PMOS type is off, no current flows in the said transistor T1.

Also depicted in FIG. 1 is the current Ip provided by the current source SC, the current Idry which passes through the transistor N1 of the amplification stage RA, and the current Iclp which passes through the transistor T1 of the limiting device LIM.

Figure 2:
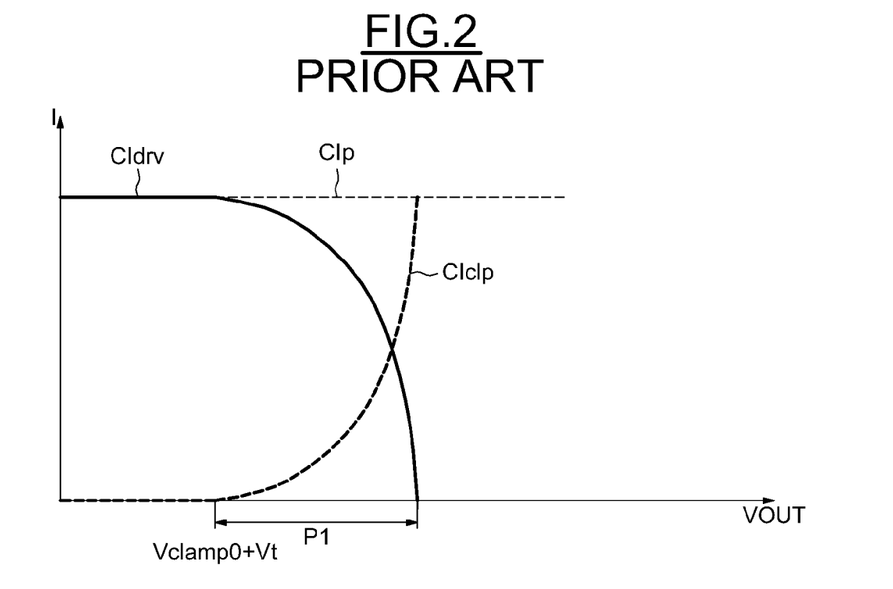
FIG. 2, already described, schematically illustrates the curves representing the main currents which traverse the device described in FIG. 1.

Represented in FIG. 2 are the curves of the main currents which pass through the system described above in FIG. 1 as a function of the voltage VOUT of the signal delivered to the output OUT of the amplification stage RA. The curve CIdry represents the current Idry which passes through the transistor N1 of the amplification stage RA, the curve CIclp represents the current Iclp which passes through the transistor T1 of the limiting device LIM and the curve CIp represents the current Ip provided by the current source SC (Ip=Idrv+Iclp).

Also represented in FIG. 2 is the voltage span P1 necessary in order for the transistor T1 of the limiting device LIM to divert the entire current of the current source SC. This voltage span P1 extends beyond the voltage Vclamp0+$V_t$, where $V_t$ is the threshold voltage of the transistor T1. In general, this voltage span is of the order of 1 Volt.

In this prior art architecture, the voltage span P1 necessary in order for the transistor T1 to absorb the entire current of the current source SC is non-negligible and may give rise to a variation in current flowing in ground.

Indeed, if the voltage VOUT increases, the voltage across the terminals of the current source SC decreases and this may cause the current of this source to reduce, and therefore create a variation in the ground potential. Furthermore, when the voltage margin across the terminals of the current source SC decreases, the current Ip provided by the current source SC may drop when the transistor T1 of the limiting device LIM turns on.

It is therefore necessary to guarantee a minimum voltage across the terminals of the current source SC so that this current source SC can operate on the one hand, and to guarantee a sufficient voltage across the terminals of the current source SC so that the current provided by the said source is constant, on the other hand, in order to prevent any current variation at ground.

BRIEF DESCRIPTION OF THE DRAWINGS

Other advantages and characteristics will be apparent on examining the detailed description of wholly non-limiting embodiments of the invention and the appended drawings in which.

DETAILED DESCRIPTION OF ILLUSTRATIVE EMBODIMENTS

Before describing the illustrated embodiments in detail, various embodiments and advantageous features are described generally in the following paragraphs.

According to one embodiment, there is proposed an image sensor comprising a device for limiting the voltage of the signal at the output of the processing system, which is aimed at ensuring that the current delivered to the device remains constant, doing so in order to avoid as far as possible any fluctuation in the ground potential.

According to one aspect, there is proposed an image sensor, comprising a matrix of active pixels having several columns for delivering at least one information signal of an active pixel; the sensor comprises means for processing the information signals delivered by the active pixels; these processing means comprise at least one amplification stage biased by a current source.

In this image sensor, the processing means comprise a device for voltage-limiting the signal. This limiting device voltage-limits the signal delivered on an output terminal of the amplification stage.

The voltage-limiting device comprises
an input terminal connected to the output terminal of the amplification stage,
a first transistor connected between the input terminal of the voltage-limiting device and a reference terminal connected to a reference power supply source, for example ground,
a gain device comprising an input connected to the input terminal of the voltage-limiting device, and an output connected to the gate of the first transistor, the gain device being configured so as to decrease the voltage span necessary to cause the first transistor to toggle from its off state to a state in which it absorbs the current provided by the said current source.

Thus, the gain device makes it possible to decrease the voltage span necessary to turn on the first transistor in such a way that the voltage across the terminals of the current source remains sufficient for it to be able to provide a constant current.

The current provided by the current source decomposes into the sum of the current which passes through the amplification stage and of the current which passes through the first transistor. The fluctuations in current on the reference terminal are then greatly reduced.

Indeed, the necessary voltage span required in order for the current flowing in the first transistor to pass from 0% to 100% has been divided by the value of the gain of the limiting device.

According to one embodiment, the gain device comprises a second transistor connected between the supply voltage of the current source and the gate of the first transistor, and whose gate is connected to the input terminal, as well as a second current source connected to the drain of the second transistor.

Therefore, provided in this embodiment is a voltage-limiting device which is simple to embody, since the gain device comprises a transistor, for example a transistor of PMOS type and a current source.

Advantageously, the type of the second transistor (PMOS or NMOS) is identical to that of the transistor or transistors which constitute the said current source which biases the said at least one amplification stage.

As is known, during an over-illumination of the pixels, the reading of the information signals arising from the pixels becomes erroneous. The eclipse phenomenon makes an over-illuminated pixel appear black instead of making it appear white.

The principle of reading a pixel consists in successively reading two voltage levels obtained by sampling electric charges on a capacitive reading node: once sampled, a given electric charge provides in principle a stable voltage level, in particular during the period of read-access to the pixel, on the order of a few microseconds.

However, this reading node is embodied technologically by a reverse diode, thereby naturally constituting a photosensitive device. On account of its photosensitivity, this node accumulates electrons (negative charges) and its potential is liable to drift negatively. In the case of very strong illumination, the drift may be significant, even over the short duration of read-access to the pixel.

Generally, the voltage levels are read at the reading node with the aid of two inverter amplifier stages. During the reading of the first voltage level of a pixel undergoing normal illumination (not over-illuminated), it is in principle necessary for this level to be stable, so as to be able to perform the initialization of the inverter amplifier stages, commonly called the auto-zero operation for the inverter amplifier stages.

This auto-zero operation is composed of two phases:
a first phase in which the first inverter stage is initialized in such a way that the output voltage of this first inverter amplifier stage settles, in principle, at a stable value lying in the gain zone of the first inverter amplifier stage; and
a second phase in which the second inverter stage is initialized in such a way that the voltage level at the output of the second inverter amplifier stage is stable.

This auto-zero operation is performed on the first voltage level of the reading node, which will be used as reference level for the calculation of the voltage variation at the reading node.

Subsequent to this auto-zero operation, the second voltage level is made to appear at the output of the pixel, so as to create a negative or zero voltage variation. This negative voltage variation produces a positive or zero variation at the output of the first inverter amplifier stage.

In the case of over-illumination, because of the spurious photosensitivity of the reading node, the reading of the first voltage level of the pixel is accompanied by a noticeable negative drift during read-access to the pixel. This negative voltage drift is amplified by the first inverter amplifier stage, whose output undergoes a positive voltage variation. In the case where the first stage is furnished with a voltage-limiting device according to the invention, the said device is liable to be triggered. In this case, when subsequently the second output voltage level of the pixel appears, producing a negative voltage variation at the input of the inverter amplifier stage, the latter's output, already being limited, remains stable.

From the point of view of the second amplifier stage, the voltage variation occurring at its input being zero, this results in a conversion identical to that which would be provided by a zero signal, stated otherwise, a signal corresponding to a black pixel. Thus, after conversion, an over-illuminated pixel restores the signal of a black pixel, this constituting the eclipse phenomenon.

According to another embodiment, there is therefore proposed an image sensor comprising a device for limiting the signal adapted so as, furthermore, to avoid the eclipse phenomenon. For this purpose, the gain device advantageously comprises a third and a fourth transistor connected in series, the said third and fourth transistors being connected between the gate of the first transistor and the supply voltage of the current source, the gate of the third transistor being connected to the input terminal, the gain device furthermore comprising activation means connected to the gate of the fourth transistor and configured so as to control its state.

The fourth transistor makes it possible to connect, in a controlled manner, the third transistor in parallel with the second transistor. By virtue of the third transistor connected in parallel with the second transistor, a voltage-limiting device which comprises two distinct limiting thresholds is provided. This makes it possible to select the limiting threshold that it is desired to apply to the signal delivered by the amplification stage.

Advantageously, the type of the third transistor (PMOS or NMOS) is identical to that of the transistor or transistors which constitute the current source which biases the said at least one amplification stage. Such a voltage-limiting device with two limiting thresholds makes it possible to avoid the eclipse phenomenon. Indeed, in the case of over-illumination, a second voltage threshold, greater than the first threshold, makes it possible to artificially create a variation of the information signal of a pixel which is very strongly illuminated during the reading of the second voltage level of the pixel. Therefore, the second voltage threshold makes it possible to correctly initialize the output of the second amplifier stage.

In the case of a non-over-illuminated pixel, after the auto-zero operation, the voltage at the output of the first stage being below the first threshold of the limiter device, it is a fortiori below the second limiting threshold; stated otherwise, the presence of the second threshold in no way modifies the conversion result for a normally illuminated pixel.

Figure 3:
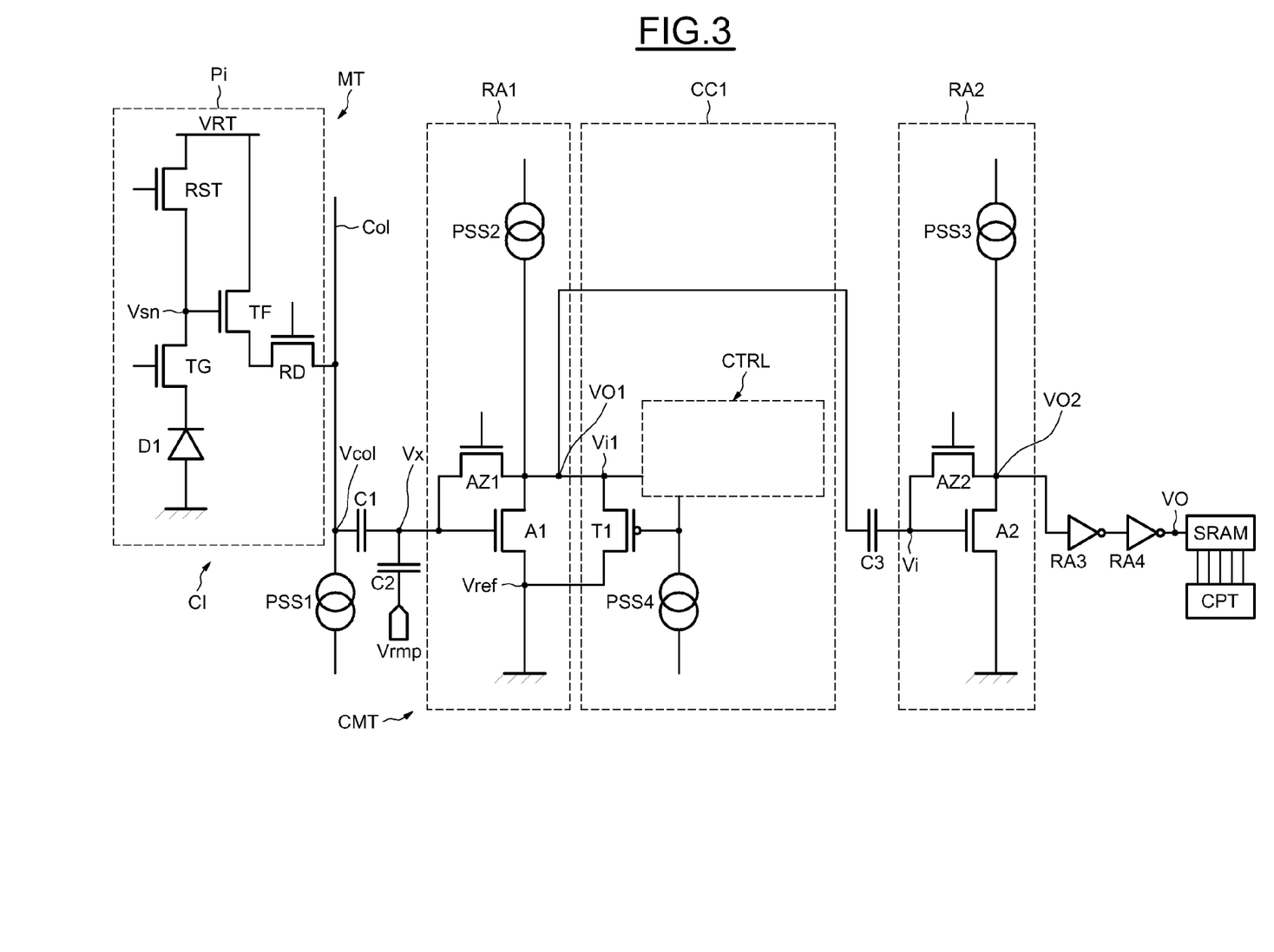
FIG. 3 illustrates in a schematic manner an embodiment of an image sensor comprising an electronic voltage-limiting device according to an embodiment of the invention.

An embodiment of an image sensor CI which comprises a voltage-limiting device CC1 has been represented in FIG. 3. This sensor CI furthermore comprises a matrix MT of active pixels Pi. This matrix MT comprises several columns Col, each column Col being connected to several pixels Pi able to deliver the information signals of the active pixels. The sensor CI furthermore comprises processing means CMT, means SRAM for recording the information of the signals and a counter CPT which participates in the recording of the information. Each processing means CMT is connected to a single column Col of the matrix.

For the sake of simplification, only one active pixel Pi, only one column Col and only one processing means CMT have been represented in FIG. 3. The active pixel Pi is commonly called a "4T" pixel since it comprises four transistors TG, RST, TF, RD, of NMOS type and a photodiode D1 for converting the light received into electric charge. This photodiode D1 is reverse-mounted and has its anode connected to ground and its cathode connected to the source of the first transfer transistor TG. This first transfer transistor TG has its drain connected to a node Vsn. This node Vsn corresponds to the reading node described above.

During the reading of a pixel, the charge accumulated in the photodiode D1 is transferred by the action of an electric field, from the photodiode D1 to the reading node Vsn. The voltage level read is that of the reading node Vsn, before and then after charge transfer, the useful signal being the difference between these two signals.

The second reinitialization transistor RST has its drain connected to a power supply terminal VRT and has its source connected to the reading node Vsn. The third follower transistor TF has its drain connected to the power supply terminal VRT, its source connected to the drain of the fourth transistor RD and its gate connected to the reading node Vsn. The fourth reading transistor RD has its source connected to the column Col. The gates of the first, second and fourth transistors are controlled by control signals delivered by drive electronics, for example a microcontroller, commonly called a line decoder, not represented for the sake of simplification.

The column Col is also connected to a first current source PSS1.

The processing means CMT comprises:
an input terminal Vcol connected to the column Col,
a first capacitor C1 connected between the input terminal Vcol and a junction point Vx,
a second capacitor C2 connected between the junction point Vx and a means for delivering a ramp signal $V_{rmp}$.

The processing means CMT furthermore comprises two pairs of inverter amplifiers RA1 to RA4, the inverter amplifiers being mounted in series between the junction point Vx and an output terminal $V_O$ of the processing means CMT that is linked to the SRAM recording means.

In the embodiment described above, the processing means is commonly called a simple-ramp analogue-digital converter. The processing means CMT has, in particular, the function of a comparator of voltage variations. In the configuration described in FIG. 3, the processing means CMT compares the voltage variations of the signal on the input terminal Vcol with the variations of the ramp signal $V_{rmp}$.

This comparison is performed in a conventional manner. The counter CPT and the ramp signal $V_{rmp}$ are triggered at the same time after the transfer transistor TG has transferred the charge accumulated by the photodiode D1 onto the reading node Vsn so as to read the second voltage level of the signal of the pixel.

The counter CPT is incremented, up to a predetermined maximum value, while the ramp signal $V_{rmp}$ is rising. When the voltage variation of the ramp signal becomes equal to the voltage variation of the signal on the input terminal Vcol, which is proportional to the voltage variation of the signal on the reading node Vsn, the output signal of the second stage toggles from the zero level to one, the comparator is said to switch, and enables the recording of the value of the counter CPT, for example in an SRAM memory. The recorded value of the counter is then proportional to the voltage variation of the signal on the reading node Vsn.

The first inverter amplifier RA1 comprises a first transistor A1 of NMOS type having its source connected to a reference terminal Vref, here connected to the earth, its drain connected to a second current source PSS2 and its gate connected to the junction point Vx.

Furthermore, the first inverter amplifier RA1 comprises a second transistor AZ1, for example of NMOS type, whose drain is connected to the junction point Vx, whose source is connected to the second current source PSS2 and whose gate is controlled by a control signal SAZ1. Moreover, the first inverter amplifier RA1 comprises an output terminal Vo1 connected to the second current source PSS2.

The second inverter amplifier RA2 has an input terminal Vi connected to a third capacitor C3, the third capacitor C3 being connected between the output terminal Vo1 of the first inverter amplifier RA1 and the input terminal Vi of the second inverter amplifier RA2.

The second inverter amplifier RA2 comprises a first transistor A2 of NMOS type having its source connected to ground, its drain connected to an output terminal Vo2 and its gate connected to the input terminal Vi. The second inverter amplifier RA2 comprises a second transistor AZ2, for example of NMOS type, having its drain connected to the input terminal Vi, its source connected to the output terminal Vo2 and its gate controlled by a control signal SAZ2. Moreover, the output terminal Vo2 is connected to a third current source PSS3.

The third and fourth inverter amplifiers RA3 and RA4 are mounted in cascade and connected between the output terminal Vo2 of the second inverter amplifier RA2 and the output terminal $V_O$ of the processing means CMT.

The voltage-limiting device CC1 is connected to the output terminal Vo1 and to the reference terminal Vref of the first inverter amplifier RA1. In this first embodiment, the voltage-limiting device CC1 comprises an input terminal Vi1 able to receive the signal at the output VO1 of the first inverter amplifier RA1.

The device CC1 also comprises a bypass transistor T1 connected between the input terminal Vi1 and the reference terminal Vref, connected here to ground. In another embodiment, other transistors, not represented here for the sake of simplification, may be connected between the reference terminal Vref and another power supply source. The bypass transistor T1 is here a transistor of PMOS type, its source is connected to the input terminal Vi1, its drain is connected to the reference terminal Vref and its gate is connected to a fourth current source PSS4. The device CC1 furthermore comprises a gain device CTRL connected between the input terminal Vi1 and the gate of the bypass transistor T1. This gain device CTRL is furthermore configured so as to decrease the voltage span necessary to cause the bypass transistor T1 to toggle from its off state to a state in which it absorbs the entire current provided by the second current source PSS2.

A second embodiment of the voltage-limiting device CC1 of the image sensor CI described above has been represented in FIG. 4. Also depicted are the references of certain elements described in the previous figure. Here the gain device CTRL comprises a second transistor T2 of PMOS type having its source S connected to the supply voltage Vdd of the second current source PSS2 of the first inverter amplifier RA1, its drain D connected to the gate of the bypass transistor T1 and to the fourth current source PSS4. The second transistor T2 has its gate G connected to the input terminal Vi1. The value of the current delivered by the fourth current source PSS4 is preferably low with respect to that delivered by the second current source PSS2. This fourth current source is intended to bias the gain device CTRL.

Figure 4:
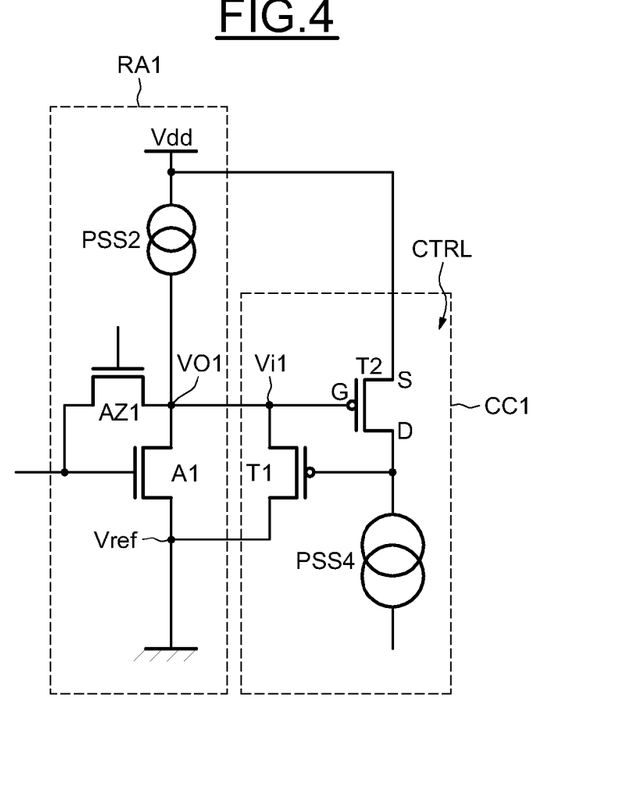
FIG. 4 illustrates in a schematic manner another embodiment of a voltage-limiting device.

It is possible to write the following electrical relation for the second transistor T2:

$$I_{DS} = \frac{\mu}{2} \cdot C_{ox} \cdot \frac{W}{L} \cdot (V_{GS} - V_t)^2 \quad \text{(equation 1)}$$

where $I_{DS}$ is the drain-source current consumed by the second transistor T2 or else the bias current provided by the fourth current source PSS4;

μ is the mobility of the charge carriers which is common to all the PMOS transistors T1 and T2;

$C_{ox}$ is the capacitance between the gate and the channel and which is common to all the PMOS transistors T1 and T2;

W is the width of the gate of the second transistor T2;

L is the length of the gate of the second transistor T2;

$V_{GS}$ is the voltage between the gate and the source of the second transistor T2; and $V_t$ is the threshold voltage of the second transistor T2.

The following second equation can be deduced from this:

$$V_{GS} - V_t = \sqrt{\frac{I_{DS}}{\beta}} \quad \text{(equation 2)}$$

where $\beta = \frac{\mu}{2} \cdot C_{ox} \cdot \frac{W}{L}$.

Moreover, a limiting threshold $V_{clamp}$ is defined, expressed by the following equations:

$$V_{clamp} = V_{dd} - V_{GS} \quad \text{(equation 3)}$$

$$V_{clamp} = V_{dd} - \left(V_t + \sqrt{\frac{I_{DS}}{\beta}}\right) \quad \text{(equation 4)}$$

Where Vdd is the supply voltage of the second current source PSS2.

Thus, when the voltage at the input terminal Vi1 is below the limiting threshold $V_{clamp}$, the second transistor T2 is on and the voltage Vdd is applied to the gate of the bypass transistor T1, which is consequently off.

When the voltage level at the input terminal Vi1 increases and when it reaches the limiting voltage $V_{clamp}$, the second transistor T2 turns off, and the voltage applied to the gate of the bypass transistor T1 falls by the discharging of its gate capacitance into the fourth current source PSS4. The device CC1 then limits the voltage of the signal at the output of the first inverter amplifier RA1 to the limiting voltage $V_{clamp}$ since the current flows entirely into the bypass transistor T1.

Figure 5:
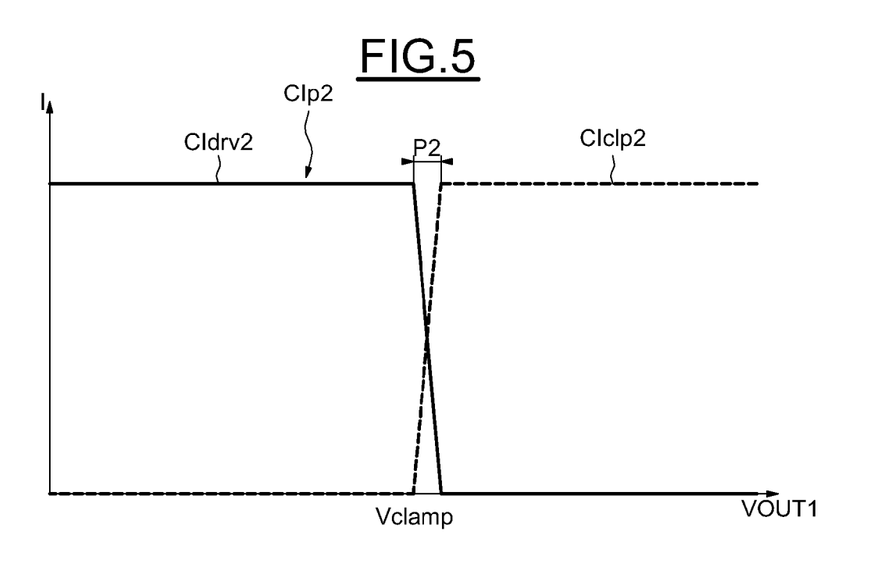
FIG. 5 schematically illustrates the curves representing the main currents which traverse the device described in FIG. 4.

Represented in FIG. 5 are the curves representing the main currents which pass through the voltage-limiting device CC1 described above in FIG. 4, as a function of the voltage VOUT1 of the signal delivered at the output VO1 of the first inverter amplifier RA1. The curve CIdrv2 represents the current Idrv2 which passes through the first transistor A1 of the first inverter amplifier RA1, the curve CIclp2 represents the current Iclp2 which passes through the bypass transistor T1 and the curve CIp2 represents the current Ip2 provided by the second current source PSS2 (Ip2=Idrv2+Iclp2).

Also represented in FIG. 5 is the voltage span P2 which corresponds to the voltage necessary to turn on the bypass transistor T1. It is noted that the voltage span P2 necessary to turn on the bypass transistor T1 is markedly below that P1 of the prior art such as described in FIG. 2.

A means is therefore provided which allows the current source PSS2 of the first inverter amplifier RA1 to remain in an operating zone where it delivers a constant current, that is to say the voltage across its terminals does not become too low since this voltage equals at the minimum, in absolute value, the voltage $V_{GS}$ as explained above. Thus the current injected into the reference terminal Vref remains constant so as to prevent the degradation of the quality of the images.

However, this means must be adapted so as to avoid the eclipse phenomenon. In order to specify the role of the improvements afforded to the voltage-limiting device according to the invention, the operating principle of the sensor such as described in FIG. 3 is described in the following figure, in a case of normal illumination and in a case of over-illumination.

Figure 6:
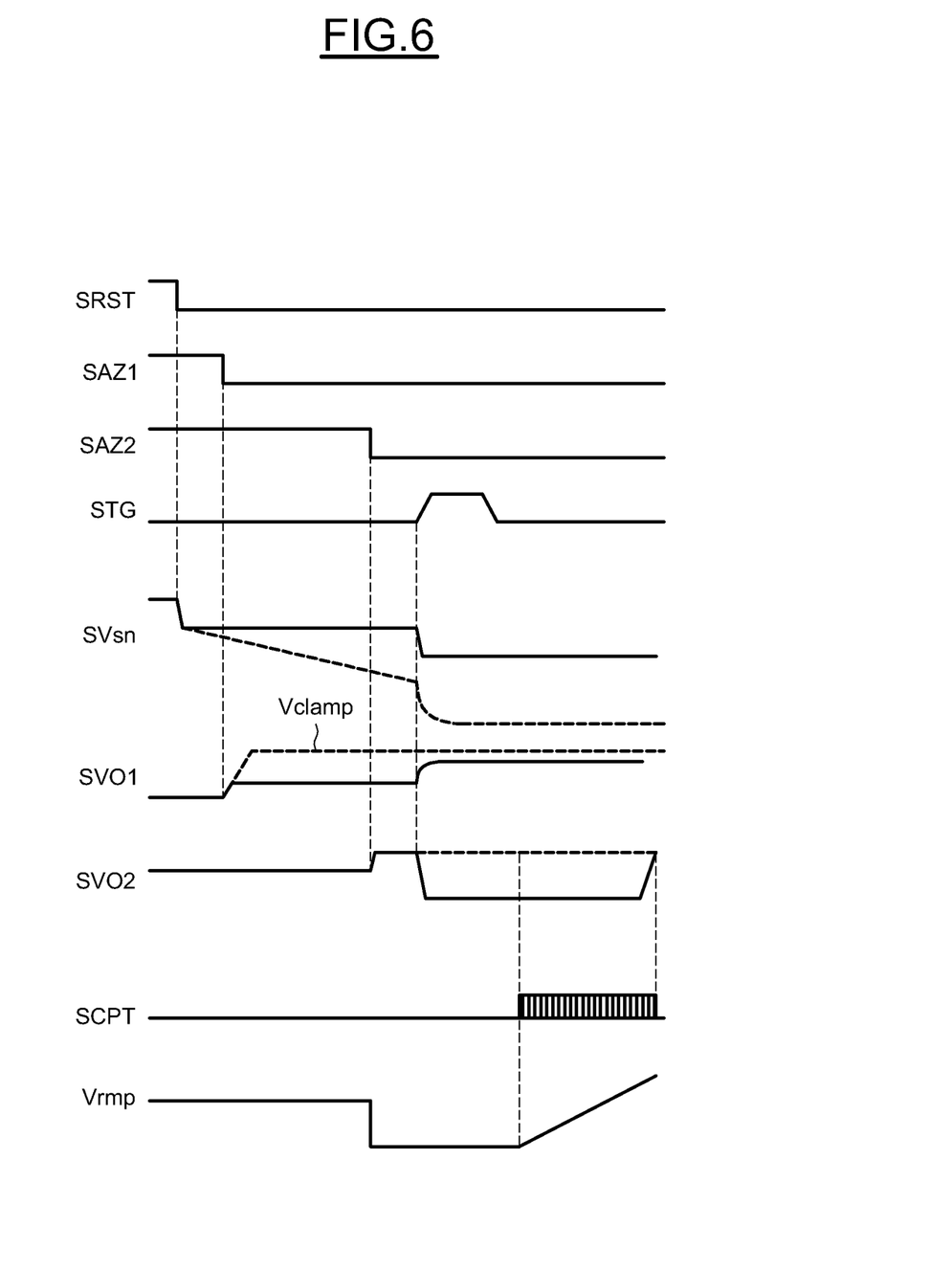
FIG. 6 schematically illustrates the timecharts of various signals used in the image sensor described in FIG. 3 comprising a voltage-limiting device described in FIG. 4.

Schematically represented in FIG. 6 are the timecharts of the main signals used in the image sensor CI furnished with a voltage-limiting device CC1 according to the embodiment described in FIG. 4. Represented are the control signal SRST of the second reinitialization transistor RST of the pixel Pi, the control signal SAZ1 of the second transistor AZ1 of the first inverter amplifier RA1, the control signal SAZ2 of the second transistor AZ2 of the second inverter amplifier RA2, and the control signal STG of the first transfer transistor TG of the active pixel Pi.

Additionally represented are the signals of the junction points of the sensor CI, namely, the signal SVsn of the reading node Vsn, the signal SVo1 of the output terminal Vo1 of the first inverter amplifier RA1, and the signal SVo2 of the output terminal Vo2 of the second inverter amplifier RA2.

Also represented are the signal SCPT of the counter CPT and the ramp signal $V_{rmp}$. Represented by solid lines are the curves of the signals upon normal illumination of the pixels on the one hand, and by dashed lines the curves of the signals upon over-illumination of the pixels on the other hand.

In the case of normal illumination, the photodiode D1 senses the light. During the integration time, the transfer transistor TG is off and the photodiode D1 stores negative charges (electrons). At the end of integration, the reading node Vsn is initialized on the basis of a falling edge of the command SRST of the reinitialization transistor RST. The reading node Vsn is therefore close to the voltage level VRT.

Next, the reading transistor RD is controlled on a rising edge so as to turn it on. Next, the first two inverter amplifiers RA1, RA2 are initialized with the aid, respectively, of a falling edge of the signal SAZ1 and of a falling edge of the signal SAZ2. This initialization corresponds to the auto-zero operation defined above. This initialization makes it possible to obtain a first stable voltage level at the output of the second inverter amplifier RA2. This first voltage level is a reference level for the comparator CMT. It may be noted that there is a small increase in the signal SV02 due to the injection of charge at the output terminal of the second inverter amplifier RA2.

Thereafter, a reading of the second voltage level, corresponding to the accumulation of charges of the photodiode D1, is performed on a rising edge of the signal STG. As the negative charges accumulated by the photodiode D1 move towards the highest potential, these negative charges will move towards the reading node Vsn. Thus, the voltage level of the reading node Vsn decreases. We therefore have a negative voltage variation at the reading node Vsn, corresponding to the useful signal. This negative voltage variation is thereafter transmitted to the input terminal Vcol of the processing means CMT, and then to the junction point Vx. This negative voltage variation at the input of the first inverter amplifier RA1 causes a positive voltage variation SVO1 at the output of RA1 and a negative voltage variation at the output of the second inverter amplifier RA2. The transfer transistor TG is thereafter turned off on a falling edge of the signal STG.

Next, we wait for the voltage level at the output of the second inverter amplifier RA2 to be stable. When it is considered that the voltage level at the output of the second inverter amplifier RA2 is stable, the ramp signal $V_{rmp}$ and the counter CPT are triggered simultaneously. As soon as the negative voltage variations of the signal and positive variations of the signal $V_{rmp}$ are equal in absolute value, the signal SVO2 at the output of the second inverter amplifier RA2 toggles from the zero logic state to the one logic state, thus enabling the recording of the value of the counter CPT in memory. This value of the counter is therefore proportional to the quantity of light absorbed by the photodiode D1.

This acquisition principle which has just been described is a conventional principle used with a sensor of "4T" type.

In the case of over-illumination of the pixels, the reading node Vsn absorbs spurious negative charges arising from the over-illumination in addition to the negative charges accumulated by the photodiode D1. In this case, before the transfer of charges from the photodiode D1, spurious negative charges accumulate on the reading node Vsn as soon as the initialization of the reading node Vsn finishes, that is to say starting from a falling edge of the command SRST of the reinitialization transistor RST.

The voltage level of the signal SVsn then falls rapidly during the first phase of the auto-zero, that is to say during the initialization of the first inverter amplifier RA1. The voltage SVo1 then increases and triggers the device CC1 voltage-limiting the signal SVo1 to the first limiting threshold $V_{clamp}$. Thus, when the second inverter amplifier RA2 is initialized, by a falling edge of the signal SAZ2, the signal SV01 is already voltage-limited to the limiting threshold $V_{clamp}$, unlike in the case of normal illumination.

Next, the charges accumulated by the photodiode D1 on the reading node Vsn are transferred so as to be able to read the second voltage level corresponding to this accumulation of charges, on a rising edge of the signal STG. In this case, the negative voltage variation at the reading node Vsn, is transmitted to the input terminal Vcol of the processing means CMT, and then to the junction point Vx. But in the case of over-illumination, this negative voltage variation at the input of the first inverter amplifier RA1 does not cause any positive voltage variation SVO1 at the output of RA1, since the signal at the output of the first inverter amplifier SV01 is already limited. In this case, the variation in voltage of the signal SVo2 is zero, whereas the real voltage variation at the reading node Vsn is a maximum.

Next, the transfer transistor TG is turned off on a falling edge of the signal STG, and the ramp signal $V_{rmp}$ and the counter CPT are triggered. Now, the output signal of the second inverter amplifier RA2 being in a high level, it enables the recording of the counter CPT in memory as soon as the latter is triggered.

Figure 7:
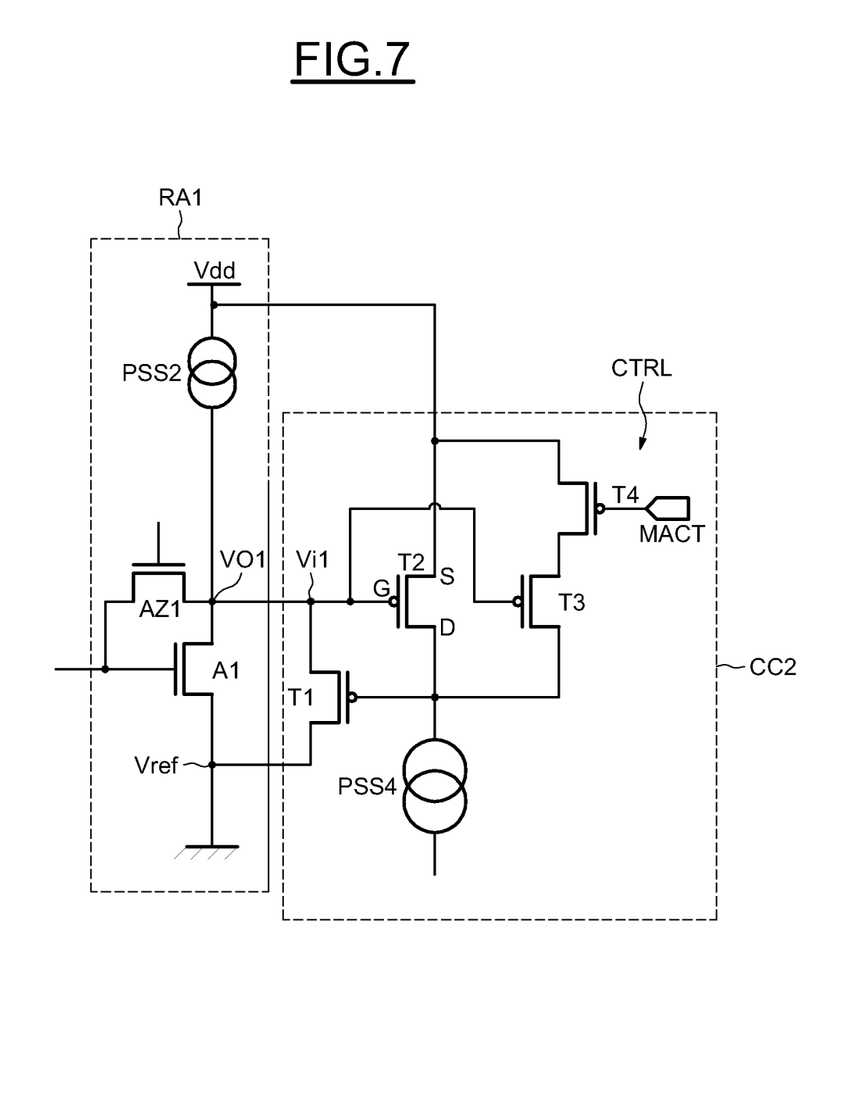
FIG. 7 illustrates in a schematic manner yet another embodiment of an image sensor comprising an electronic voltage-limiting device.

Thus, an initial zero value of the counter is recorded, instead of a maximum value, corresponding to a black pixel, thereby manifesting the eclipse phenomenon defined above. In order to avoid the eclipse phenomenon, another embodiment of the limiting device CC2 described in FIG. 7 is proposed.

The references of certain elements described in the previous figures have also been depicted. In this embodiment, the gain device CTRL comprises a third transistor T3, of PMOS type, and a fourth transistor T4, of PMOS type.

The third transistor T3 has its gate connected to the input terminal Vi1, its source connected to the fourth transistor T4 and its drain connected to the fourth current source PSS4. The fourth transistor T4 has its source connected to the supply voltage of the second current source PSS2, its drain connected to the source of the third transistor T3, and its gate receives a control signal ST4 from activation means MACT. The activation means MACT are for example embodied with the aid of a logic circuit. This command ST4 of the fourth transistor T4 is a signal of the Boolean type which makes it possible to turn the transistor T4 on or off as a function of the voltage limiting threshold that it is desired to obtain with the aid of the device CC2. The fourth transistor T4 being of the PMOS type, the latter is on when the command ST4 equals 0. Thus, when the fourth transistor T4 is off, the voltage-limiting device CC2 behaves in the same manner as that described above in FIG. 2.

As a variant, the fourth transistor T4 may be connected between the third transistor T3 and the fourth current source PSS4. In this variant, the third transistor T3 has its source connected to the supply voltage of the second current source PSS2, and its drain connected to the fourth transistor T4. The fourth transistor T4 has its source connected to the drain of the third transistor T3 and its drain connected to the fourth current source PSS4.

When the fourth transistor T4 is on, the limiting threshold of the device CC2 increases, and thus provides a second limiting threshold Vclamp2 of greater value than the first voltage limiting threshold $V_{clamp}$.

Indeed, when the fourth transistor T4 is on, the second and third transistors T2, T3 are placed in parallel, and on account of the paralleling of the second and third transistors T2, T3, the ratio of the equivalent transistor increases. Moreover, $C_{ox}$ which is the capacitance between the gate and the channel is common to all the PMOS transistors T1 to T4 and μ which is the mobility of the charge carriers is also common to all the PMOS transistors T1 to T4. This then results in an increase in the factor β, and therefore the limiting threshold $V_{clamp}$ increases up to a second threshold value Vclamp2.

Furthermore the voltage variation between the second limiting threshold Vclamp2 and the first limiting threshold $V_{clamp}$ is small with respect to the voltage span P1 of the prior art required to turn on the bypass transistor T1, which is about 1V.

Moreover, this voltage variation is sufficient to cause a negative variation of the signal at the output of the second inverter amplifier RA2 and for the signal SVO2 to be in a low state upon the triggering of the counter CPT, thereby making it possible to prevent the eclipse phenomenon.

Figure 8:
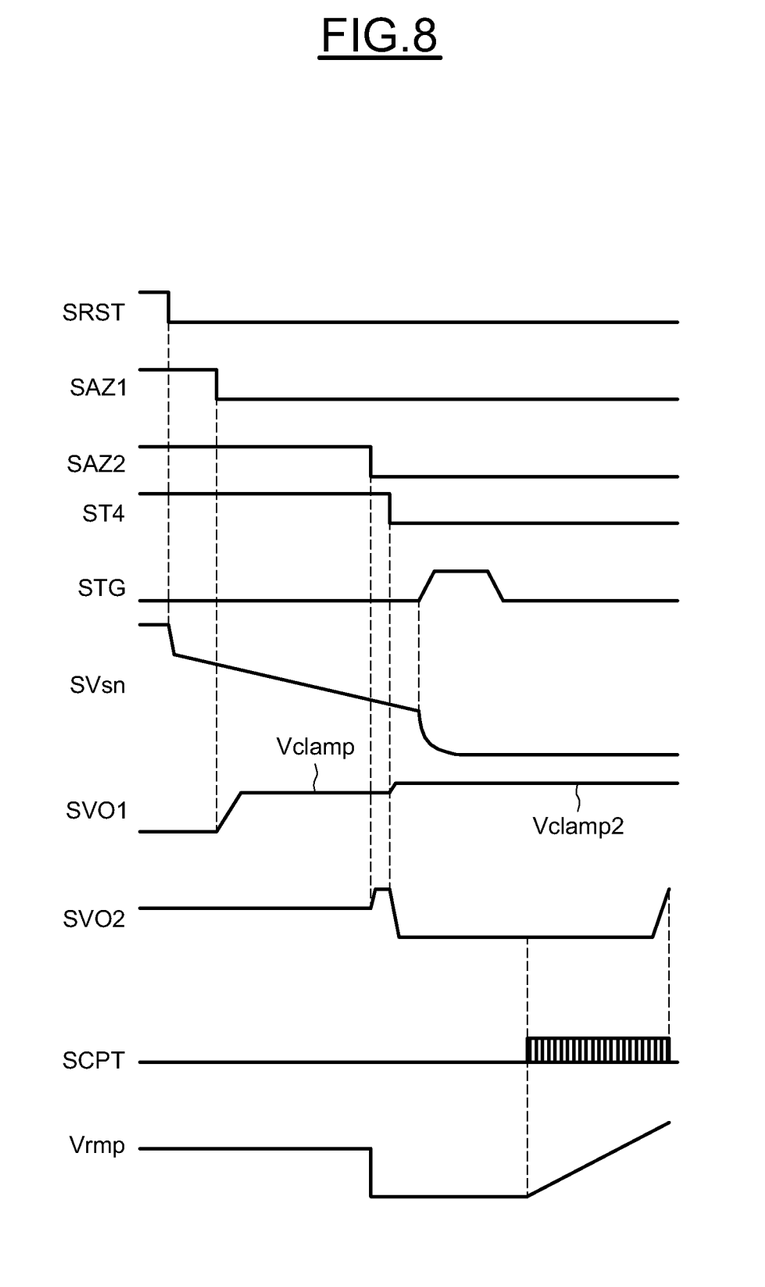
FIG. 8 illustrates in a schematic manner the timecharts of various signals used in an image sensor comprising a voltage-limiting device described in FIG. 7.

The operating principle of the image sensor CI comprising the limiting device such as described in FIG. 7 is illustrated in a schematic manner in FIG. 8. The main signals used by the sensor CI have been represented in FIG. 8.

Schematically represented are the control signal SRST of the second reinitialization transistor RST of the pixel Pi, the control signal SAZ1 of the second transistor AZ1 of the first inverter amplifier RA1, the control signal SAZ2 of the second transistor AZ2 of the second inverter amplifier RA2, the control signal ST4 of the fourth transistor T4 of the device CC2, and the control signal STG of the first transfer transistor TG of the active pixel Pi.

Furthermore represented are the signals of the junction points of the sensor CI, namely, the signal SVsn of the reading node Vsn, the signal SVo1 of the output terminal Vo1 of the first inverter amplifier RA1, and the signal SVo2 of the output terminal Vo2 of the second inverter amplifier RA2. Also represented are the signal SCPT of the counter CPT and the ramp signal $V_{rmp}$.

The operating principle of the sensor CI has already been described in FIG. 6 and corresponds to the conventional acquisition principle used with a sensor of "4T" type. In particular, during over-illumination, the voltage at the reading node SVsn drifts negatively during the first auto-zero phase, and the voltage on the output terminal V01 of the first inverter amplifier RA1 increases greatly until it is limited by the first limiting threshold $V_{clamp}$ of the voltage-limiting device CC2. When a single limiting threshold is used, the eclipse phenomenon appears.

Thus, when a second limiting threshold Vclamp2 is used, the second inverter amplifier RA2 can be initialized by setting the signal SVO2 at the output of the latter to the low level. For this purpose, the fourth transistor T4 is controlled on a falling edge of the signal ST4, the effect of this being to increase the limiting threshold to the value of the second limiting threshold Vclamp2.

Thus, with the aid of a voltage-limiting device CC2 having two limiting thresholds, the output of the comparator remains continually at zero throughout the duration of the ramp. Consequently the comparator does not provide any recording signal to the SRAM, and in this case, control logic records the final and maximum value of the counter. Thus, the conversion result for an over-illuminated pixel provides a maximum code, thereby making it possible as expected to restore a white pixel to the display, and therefore to correct the eclipse phenomenon.

Thus, an image sensor which makes it possible to obtain images of high quality is provided, since it makes it possible to limit the sensor current variations, while avoiding the eclipse phenomenon. Conversely, with the aid of a voltage-limiting device CC2 having two limiting thresholds, it is possible to record a maximum value of the counter.

What is claimed is:

1. An image sensor, comprising:
   a matrix of active pixels having several columns for delivering at least one information signal of an active pixel; and
   a processor coupled to receive the at least one information signal delivered by said active pixel, the processor including:
      at least one amplification stage biased by a current source, and
      a device for voltage-limiting the signal delivered on an output terminal of said at least one amplification stage, the device including an input terminal connected to the output terminal, a first transistor connected between the input terminal and a reference terminal connected to a reference power supply source, a gain device having an input connected to the input terminal, and an output connected to the gate of the first transistor, the gain device being configured so as to decrease the voltage span necessary to cause the first transistor to toggle from its off state to a state in which it absorbs the current provided by said current source,
   wherein the gain device comprises:
      a second transistor connected between a supply voltage of said current source and the gate of the first transistor, and having a gate connected to the input terminal, and
      a second current source connected to the drain of the second transistor.

2. The image sensor according to claim 1, in which the first and second transistors are of PMOS type.

3. The image sensor according to claim 1, in which the reference power supply source is ground.

4. The image sensor according to claim 1, in which the gain device comprises:
   a third and a fourth transistor connected in series, said third and fourth transistors being connected between the gate of the first transistor and a supply voltage of said current source, the gate of the third transistor being connected to the input terminal, and
   an activation circuit connected to the gate of the fourth transistor and configured so as to control its state.

5. The image sensor according to claim 4, in which the current source which biases the said at least one amplification stage comprises at least one transistor of the same type as that of the second and third transistors.

6. The image sensor according to claim 4, wherein the third transistor comprises a transistor type identical to that of the first and second transistors.

7. The image sensor according to claim 4, wherein the third and fourth transistors are of a PMOS type.

8. The image sensor according to claim 1, in which the voltage-limiting device provides at least one limiting threshold whose value is dependent on characteristics of the second transistor.

9. An image sensor, comprising:
a matrix of active pixels having several columns for delivering at least one information signal of an active pixel;
a processor coupled to receive the at least one information signal delivered by said active pixel, the processor including:
at least one amplification stage biased by a current source,
a device for voltage-limiting the signal delivered on an output terminal of said at least one amplification stage, the device including an input terminal connected to the output terminal, a first transistor connected between the input terminal and a reference terminal connected to a reference power supply source, a gain device having an input connected to the input terminal, and an output connected to the gate of the first transistor, the gain device being configured so as to decrease the voltage span necessary to cause the first transistor to toggle from its off state to a state in which it absorbs the current provided by said current source; and
at least one second amplification stage connected to said at least one amplification stage, the voltage-limiting device being connected between said amplification stage and second amplification stage.

10. An image sensor comprising:
an active pixel configured to generate an information signal;
an amplifier stage coupled to the active pixel and configured to amplify the information signal; and
a voltage-limiting stage coupled to the amplifier stage and including:
a current shunting device having a first terminal connected to an output of the amplifier stage, a second terminal connected to a reference voltage node, and a control terminal,
a gain device connected to the control terminal of the current shunting device and configured to decrease the voltage span required to cause the current shunting device to enter into a current shunting mode, and
a second current source connected between the control terminal of the current shunting device and ground.

11. The image sensor according to claim 10, wherein the active pixel is one pixel in a matrix of pixels.

12. The image sensor according to claim 10, wherein the current shunting device is a first transistor.

13. The image sensor according to claim 10, wherein the amplifier stage comprises a current source series connected with a second transistor.

14. The image sensor according to claim 13, in which the first and second transistors are of PMOS type.

15. The image sensor according to claim 10, further comprising an information signal output terminal and a memory coupled to the information signal output terminal.

16. The image sensor according to claim 10, wherein an output of the amplifier stage is directly connected to an input of the voltage-limiting stage.

17. An image sensor comprising:
an active pixel configured to generate an information signal;
an amplifier stage coupled to the active pixel and configured to amplify the information signal; and
a voltage-limiting stage coupled to the amplifier stage and including:
a current shunting device having a first terminal connected to an output of the amplifier stage, a second terminal connected to a reference voltage node, and a control terminal,
a gain device connected to the control terminal of the current shunting device and configured to decrease the voltage span required to cause the current shunting device to enter into a current shunting mode,
wherein the current shunting device is a first transistor, and
wherein the gain device comprises a third and a fourth transistor connected in series, said third and fourth transistors being connected between the control terminal of the first transistor and a supply voltage of a current source, the gate of the third transistor being connected to an output of the amplifier stage, and an activation circuit connected to the gate of the fourth transistor and configured so as to control its state.

18. The image sensor according to claim 17, wherein the activation circuit comprises a logic circuit coupled to the gate of the fourth transistor.

19. An image sensor comprising:
an active pixel configured to generate an information signal;
an amplifier stage coupled to the active pixel and configured to amplify the information signal;
a voltage-limiting stage coupled to the amplifier stage and including:
a current shunting device having a first terminal connected to an output of the amplifier stage, a second terminal connected to a reference voltage node, and a control terminal,
a gain device connected to the control terminal of the current shunting device and configured to decrease the voltage span required to cause the current shunting device to enter into a current shunting mode; and
a second amplifier stage connected to said amplifier stage, the voltage-limiting stage being connected between said amplifier stage and second amplifier stage.

20. The image sensor according to claim 16, wherein the active pixel is one pixel in a matrix of pixels.

21. The image sensor according to claim 16, wherein the current shunting device is a first transistor.

22. The image sensor according to claim 16, wherein the amplifier stage comprises a current source series connected with a second transistor.

23. The image sensor according to claim 16, further comprising an information signal output terminal and a memory coupled to the information signal output terminal.

24. The image sensor according to claim 19, wherein an output of the amplifier stage is directly connected to an input of the voltage-limiting stage.

25. An image sensor comprising:
an active pixel configured to generate an information signal;
an amplifier stage coupled to the active pixel and configured to amplify the information signal; and
a voltage-limiting stage coupled to the amplifier stage and including:
a current shunting device having a first terminal connected to an output of the amplifier stage, a second terminal connected to a reference voltage node, and a control terminal,
a gain device connected to the control terminal of the current shunting device and configured to decrease the voltage span required to cause the current shunting device to enter into a current shunting mode,
wherein the amplifier stage comprises a current source series connected with a second transistor, and
wherein the voltage-limiting stage provides at least one limiting threshold whose value is dependent on characteristics of the second transistor.

* * * * *

UNITED STATES PATENT AND TRADEMARK OFFICE
CERTIFICATE OF CORRECTION

PATENT NO. : 8,569,673 B2  Page 1 of 1
APPLICATION NO. : 13/182071
DATED : October 29, 2013
INVENTOR(S) : Laurent Simony It is certified that error appears in the above-identified patent and that said Letters Patent is hereby corrected as shown below:

In the Claims:
In Col. 14, line 42, claim 20, delete "claim 16" and insert --claim 19--.
In Col. 14, line 44, claim 21, delete "claim 16" and insert --claim 19--.
In Col. 14, line 46, claim 22, delete "claim 16" and insert --claim 19--.
In Col. 14, line 49, claim 23, delete "claim 16" and insert --claim 19--.

Signed and Sealed this
Tenth Day of December, 2013

Margaret A. Focarino
*Commissioner for Patents of the United States Patent and Trademark Office*